United States Patent
Ayyagari et al.

(10) Patent No.: US 6,947,407 B2
(45) Date of Patent: Sep. 20, 2005

(54) POWER CONTROL BASED ADMISSION METHODS FOR MAXIMUM THROUGHPUT IN DS-CDMA NETWORKS WITH MULTI-MEDIA TRAFFIC

(75) Inventors: Deepak V. Ayyagari, Watertown, MA (US); Anthony Ephremides, North Bethesda, MD (US)

(73) Assignees: Verizon Laboratories Inc., Waltham, MA (US); University of Maryland, College Park, MD (US)

( * ) Notice: Subject to any disclaimer, the term of this patent is extended or adjusted under 35 U.S.C. 154(b) by 890 days.

(21) Appl. No.: 09/732,359

(22) Filed: Dec. 7, 2000

(65) Prior Publication Data

US 2001/0040881 A1 Nov. 15, 2001

Related U.S. Application Data

(60) Provisional application No. 60/169,849, filed on Dec. 9, 1999.

(51) Int. Cl.[7] ............................................. H04B 7/216
(52) U.S. Cl. ...................................... 370/342; 370/335
(58) Field of Search ............................... 370/230, 310, 370/328, 329, 335, 342

(56) References Cited

U.S. PATENT DOCUMENTS 6,069,883 A * 5/2000 Ejzak et al. ................. 370/335
6,597,705 B1 * 7/2003 Rezaiifar et al. ............. 370/468

OTHER PUBLICATIONS

I et al. "Multi–Code CDMA Wireless Personal Communications Network". IEEE. Jun. 1995. pp. 1060–1064.*

* cited by examiner

Primary Examiner—Chi Pham
Assistant Examiner—Derrick W Ferris
(74) Attorney, Agent, or Firm—Leonard C. Suchyta, Esq.; Joel Wall, Esq.; Rader, Fishman & Grauer PLLC

(57) ABSTRACT

A method for maximizing the data throughput over a multi-code DS-CDMA network by controlling the number of codes assigned to each user while controlling the power budget of each user so that each users bit energy to noise ratio is met along with the quality of service and frame error rate requirements. A method is also provided for maximizing the throughput over a variable gain DS-CDMA network in which each user uses only one code and changes the data rate and power to meet quality of service requirements. In both systems, new users will be admitted so long as the power budget and bit energy to noise ratio requirements of each user is maintained. Both systems become closed to new admissions if the addition of a new user would cause any active user to not meet its required performance.

38 Claims, 2 Drawing Sheets

POWER CONTROL BASED ADMISSION METHODS FOR MAXIMUM THROUGHPUT IN DS-CDMA NETWORKS WITH MULTI-MEDIA TRAFFIC

The present application claims priority based on the provisional application Ser. No. 60/169,849, filed on Dec. 9, 1999, the entire contents of which are incorporated herein by reference.

FIELD OF THE INVENTION

The present invention relates to a method for jointly controlling the data rates and transmit power of users so as to maximize throughput in cellular Direct Sequence Code Division Multiple Access (DS-CDMA) networks. The invention is applied to both multi-code (MC-CDMA) and variable gain (VG-CDMA) systems in order to maximize throughput in both systems.

BACKGROUND OF THE INVENTION

There is an increasing use of multi-media transmissions over cellular CDMA networks. However, a CDMA cellular network is by its very nature interferences limited. The layering of each signal across the available bandwidth increases the interference and affects the overall bandwidth utilization.

Attempts have been made in the past to limit the amount of interference by limiting the number of network users. This obviously affected the throughput of the network and also adversely affected new admissions to the network.

In a CDMA environment, in order to provide efficient bandwidth utilization the resources of the users that can be controlled are transmit power and data rates. The approach of power based admission policies has been to determine if a new potential user and existing users have sufficient power budgets to allow the new potential user to transmit at the requested data rate. Each user has an information bit energy to noise ratio that must be met in order to achieve desired quality of service requirements. It has been found, however, that the users cannot typically be allowed to transmit at their full transmit power capability since this adds unnecessary interference to the system, which in turn limits the number of possible users and the data throughput. Thus, the transmit power of each user has to be controlled to limit interference while at the same time allowing sufficient power to meet the users requirements Besides power, the second user resource that can be controlled to maximize usage of the CDMA network is the data rate of the user. Two systems have been proposed for controlling the data rate. In a multi-code Code Division Multiple Access (MC-CDMA) system, each user operates at a fixed data rate using one or more codes to carry the information. The processing gain of each user is the same since the data rate is fixed. Processing gain is defined as the ratio between the signal baseband bandwidth and the spread spectrum bandwidth. Users attain higher data rates by using multiple codes simultaneously. In a Variable Gain Code Division Multiple Access (VG-CDMA) system, only one code is used by each user and the data rate is changed to meet the users data transfer requirements. The processing gain of the system changes inversely with the data rates. In both variable gain and multicode CDMA networks, provisions must be made to control the admission of new users in order for the system to operate at maximum throughput. The quality of services and Frame Error Rate of the user is dependent on the received bit energy to noise power ratio. Therefore, the admission strategy must ensure that the received bit energy to noise ratio for all user codes that are activated is above the required threshold.

A detailed mathematical analysis of the derivation of the algorithms for controlling the data rates and transmit power of users, so as to maximize throughput in cellular DS-CDMA networks is presented in the following references, which are hereby incorporated herein by reference in their entirety.

1) D. V. Ayyagari and A. Ephremides in Power Control Based Admissions Algorithms for Maximizing Throughput in DS-CDMA Networks with Multi-Media Traffic. IEEE-WCNC 1999, Sep. 25, 1999.
2) D. V. Ayyagari, Capacity and Admission Control in Multi-Media DS-CDMA Wireless Networks. Ph.D. Dissertation, University of Maryland, College Park, 1998.

SUMMARY OF THE INVENTION

In accordance with the present invention, an optimum system and method are provided for the admission of new users to a datalink using multi-code Code Division Multiple Access (MC-CDMA) and variable gain Code Division Multiple Access (VG-CDMA) networks. The MC-CDMA admission process is much simpler since all users of the network are using the same data rate and have the same processing gain. The VG-CDMA admission procedure is complicated by the use of varying data rates, depending on the type of information being transmitted over a multi-media data link, which cause the processing gain to vary inversely to the data rate. However, the variable gain procedure can be substantially simplified if a less than optimum solution is acceptable. A less than optimum technique is also taught herein. Both systems tend to maximize throughput through their respective CDMA networks.

Most generally, the inventive system comprises a plurality of users having different bit energy to noise requirements. There is a limited capacity, defined in terms of number of codes or data rates on individual codes available to be used by the network for allocation to users, the limit being determined by the constraint of meeting the bit energy to noise requirements of the active users. There is also a limited overall power allocation available for each of the potential codes. An admission protocol maximizes capacity utilization within the network with the limited overall power budget.

With respect to an MC-CDMA network the admission protocol arranges the networks in increasing order based on the bit energy to noise requirements. It includes the testing of multiple potential codes for generally simultaneous activation, the number of multiple potential codes being reduced until an acceptable threshold is met, the threshold being limited by the overall available power allocation such that network failure is minimal for the existing active codes within the network.

For a VG-CDMA network the users are further broken down into users at different powers, the users being separated into different power groups as well as users at different data rates, the users being separated into different data rate sets. In a preferred teaching, the allocation protocol includes users in two different power groups and three different rate groups, two of the rate groups calculated in terms of the third rate group.

The network of the invention is discussed most specifically with respect to cellular applications. However, the various methodologies are equally applicable to local area networks, wide area networks, metropolitan area networks and fixed wireless networks.

DETAILED DESCRIPTION

Figure 1:
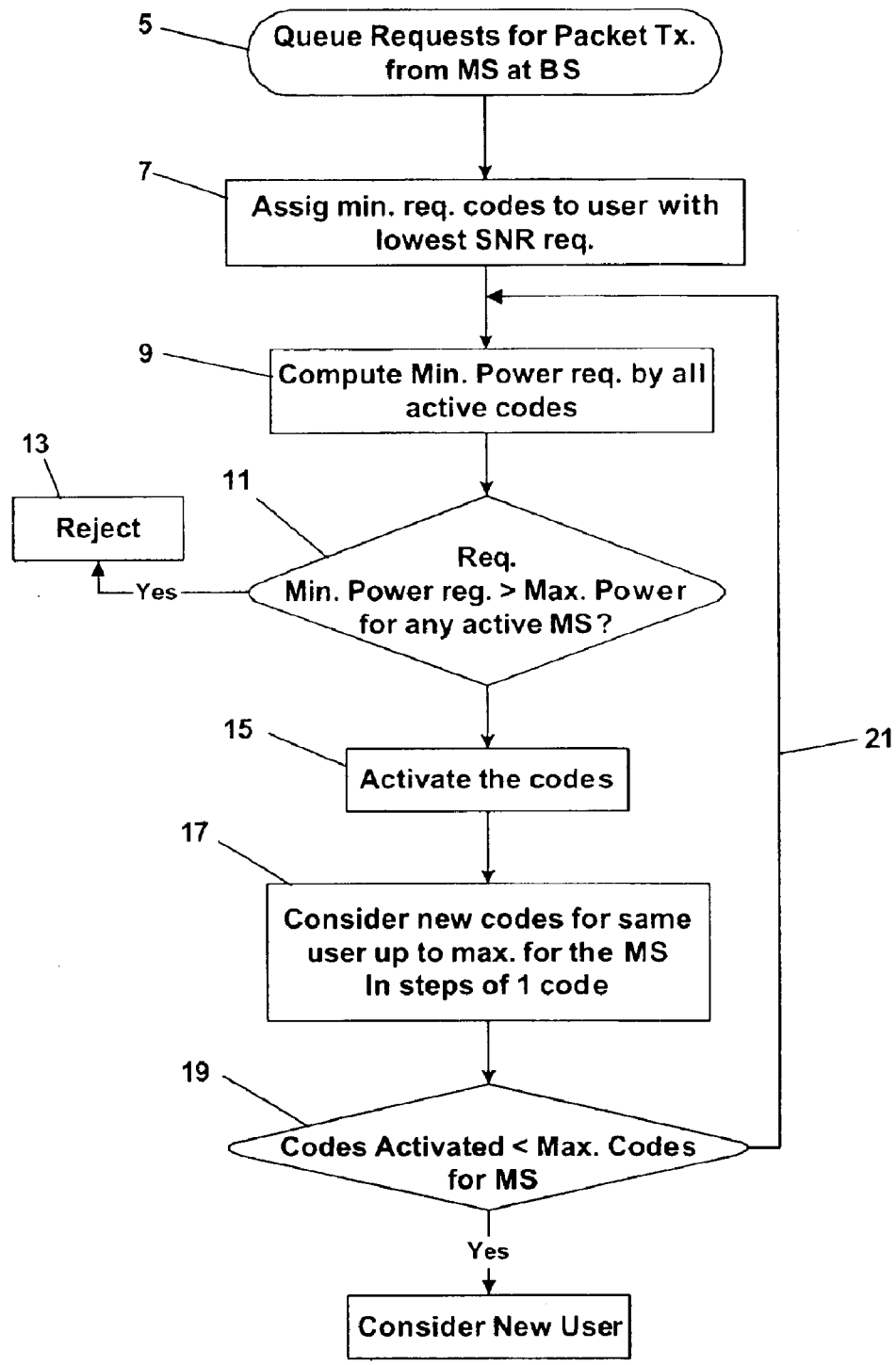
FIG. 1 is a flowchart showing the steps to optimizing throughput through a multi-code DS-CDMA network.

Efficient bandwidth utilization is necessary to provide multi-media services on a cellular CDMA platform. In a CDMA environment, the resources of the users that can be controlled to provide the most efficient bandwidth utilization are the transmit powers and the data rates.

The most important attribute of the multi-code MC-CDMA system is that the data rate and hence the processing gain of each code is the same. Users attain higher data rates by using multiple codes simultaneously. The Frame Error Rate of the users is dependent on the received bit energy to noise power ratio $E_b/N_0$. Frame Error Rate is a measure of errors made in transmitting between a mobile unit and a base station while the received bit energy to noise power ratio is the signal to noise ratio necessary for two way communication. Therefore, an admission policy must ensure that the received $E_b/N_0$ for all user codes that are activated, is above a required threshold. In the following, "activation" of a code means the particular mobile user is assigned a power level and given permission to transmit at a fixed data rate by a cellular network base station ("BS"). Activation of the new code also implies that all the codes that are currently active can continue to remain active.

Each mobile user has constraints on the minimum and maximum number of codes that can be used as well as a limitation on the maximum transmit power. The maximum received power is a function of the handset transmitter peak output power and the propagation gain from the user's current location (collectively, transmit power plus path gain and the system losses, is the user's power budget). A code allocation or activation is said to have a feasible or acceptable power allocation if the power that would be required by all active users upon activation of the new code, is equal to or less than the maximum transmission power capability of the users and the $E_b/N_0$ minimum threshold target is met for all active codes. Ideally, a power is selected that works the best while producing the least amount of interference.

The objective of an admission policy based on rate allocation is to determine the code allocation such that the overall traffic carried by the system is maximized, that is, the sum of the data rates allocated to all the users is maximized. Since the data rate per code is fixed, the reward function that must be optimized by the admission policy equals the sum of the number of codes activated for all users.

Since each code has the same data rate R in a MC-CDMA network, the reward function appreciates by R, irrespective of the user who was allocated the new code. However, the effect of admitting the new code on the active user powers depends on the $E_b/N_0$ target of the admitted user. Peak capacity is reached when one or more users become power limited. Therefore, the admission policy must activate the code with the least impact, in terms of increases in power levels and interferences, in order to improve the capacity. Ideally, a user is added that contributes the least amount of interference. The policy modulates the signal and spreads it across the entire bandwidth. The signals are layered on top of one another.

The method of the present invention is shown, in a MC-CDMA environment in FIG. 1, where 5 shows a queue of mobile users ("MS") that have requested the base station for permission to transmit data packets. These MS have also specified to the BS their maximum and minimum data rate requirements (by other means such as out-of-band signaling or contention access on control channels) admission to the network from the base station The base station begins the admission process at 7 where it assigns the minimum feasible number of requested codes to the mobile user with the lowest signal to noise ratio requirement.

A code activation is said to have a feasible power allocation if the power requested for the activated code is less than the maximum power for all codes and the signal to noise ratio targets are met for all active codes.

The base station continues admitting users from the queue in progressively increasing order of signal to noise ratios in order to maximize the number of new codes that can be activated. At point 9, the base station computes the minimum power levels of the new codes to be activated and the new powers of all active users, which change to compensate for the interference caused by the addition of new users to the network. Thus, the network computes the minimum transmit power required by all active codes and all proposed additional codes caused by the addition of new users to the network.

The minimum transmit power required can be computed easily from the minimum received power required to maintain a desired $$\frac{E_b}{N_0}$$

for each active user and from their link budgets.

Without loss of generality, let there be M users with active codes or codes being considered for activation and let $s_i$ be the received power from the i-th user. If W is the spread spectrum bandwidth and R is the data rate per code and $c_i$ is the number of codes active or being activated for the i-th user, the minimum received powers required by all M users $s_i$–$s_M$ are given by:

$$\frac{\frac{W}{R} \times s_i}{\sum_{j \neq i} c_j s_j + (c_i - 1)s_1 + \eta} = \gamma$$

where the $$\frac{E_b}{N_0}$$

of the i-th user is $\gamma_i$ and $\eta$ is the sum of out of cell interference power and thermal noise. The notation "j" represents all users who are different from the "ith" user being considered in the equation. The summation in the denominator represents powers from all other users excluding user "i". The minimum transmit power required is then obtained as follows:

Transmission Power (Tx)=Received Power (Rx)+Path loss+System losses

The base station also makes sure that no mobile station that is currently active is power limited. If any of the active mobile users require power greater than the maximum transmit power of any mobile user at point 11, the base station refuses admission at point 13.

If the minimum power required is not greater than the maximum power for any active mobile user MS, at point 15 the base station activates the codes requested for a proposed user. At 17, the base station continues the code activation process for additional codes of the same user in steps of 1, testing at point 19 that the number of codes activated do not exceed the maximum number requested by the mobile station. Thus, the base station looks at the addition of codes one at a time up to the maximum number of codes desired by a user.

On the acceptance of each set of new codes, as shown by arrow 21, the base station determines that the power to be allocated to the desired codes is within the maximum power capability of all the active mobile stations at point 11 as discussed above and either activates the codes at point 15 or rejects the proposed codes at point 13. When the maximum number of codes has been activated, the base station terminates the admission process for that particular user and returns to point 5 to consider a new user. The new user is the user in the request queue with the lowest signal-to-noise ("SNR") requirement. In case of a tie, the user may be chosen arbitrarily or based on the lowest number of codes required. As the process continues, the base station also continuously monitors the state of the network. In particular, as codes are activated or become deactivated, it adjusts the power level for all active users to ensure that they stay above their signal to noise ratio limit.

As the base station determines that the admission process is approaching the end for a particular user, it can test to see if a feasible power allocation exists by the simultaneous activation of a minimum number of codes. The base station tests that the power allocation requested is less than the maximum power allocated to the user. If not, the base station rejects the codes being considered for activation and terminates the admission process.

By testing the feasibility of each set of codes considered for activation, the base station ensures that each user is operating at the optimal power level and that the network is operating at its maximum throughout having the maximum number of activated codes.

Most generally, the DS-CDMA network comprises a plurality of users having different bit energy to noise requirements. There is a limited capacity, defined in terms of number of codes or data rates on individual codes available to be used by the network for allocation to users, the limit being determined by the constraint of meeting the bit energy to noise requirements of the active users. There is also a limited overall power allocation available for each of the potential codes. An admission protocol is used to maximize the capacity utilization within the network with the limited overall power budget. In contrast to a MC-CDMA network where the activation of each new code as part of the admission protocol adds a discrete block of data rate to the reward function, in a VG-CDMA network the data rate added as part of an admission protocol depends on the type of information that each multi-media user wishes to transmit. In a VG-CDMA network each user is assigned a single code. The data rate of the single code depends on the mode of information being transmitted. For example, the transmission of video information would use a much higher data rate than the transmission of voice information. In a VG-CDMA network both the data rate per code and power level are changed. The reward function that is maximized is the sum of the data rates of all active users.

Each user's data rate requirements are based on the type of information to be transmitted (e.g. voice, data, or video). The base station activates a code or specifies a particular data transmission rate for the code for each user with the goal of maximizing throughput within the power constraints of the system. Higher data rates require higher power. Therefore, the base station must control both the data rate, by user selection, and the power of the users to maximize throughput.

Figure 2:
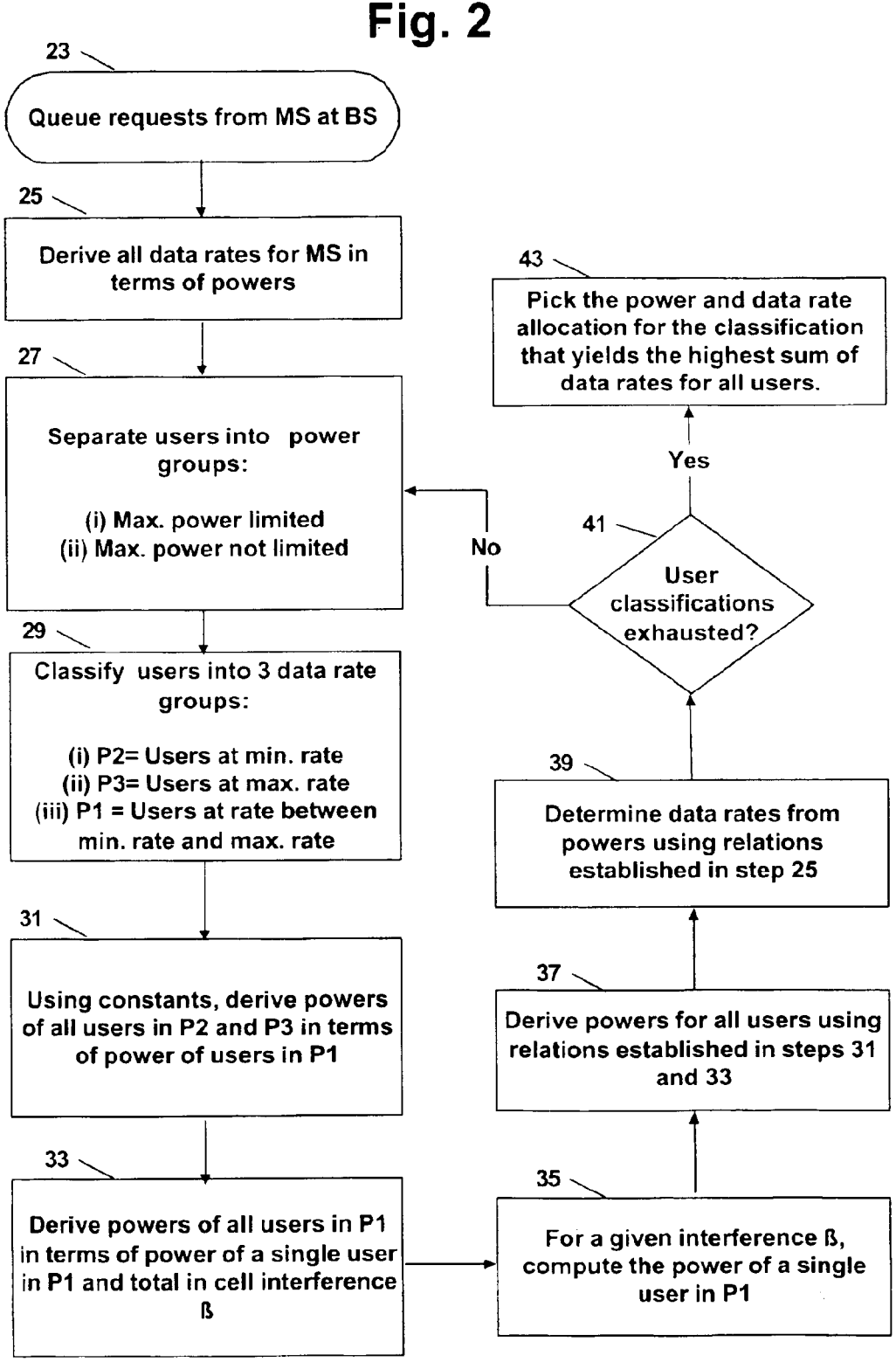
FIG. 2 is a flowchart showing the steps in optimizing data rate and power in a variable gain DS-CDMA network.

The following is a brief outline of the steps, illustrated in FIG. 2, used to calculate the optimum data rate and power before the presentation of the detailed mathematical procedures.

The process begins in step 23, where all the requests for bandwidth from the different mobile users are queued at the base station. The requests specify the maximum and minimum power capabilities of the mobile users as well as the minimum and maximum data rate requirements.

Next, at step 25, data rates to be assigned to the users are all derived or expressed in terms of the received powers the base station requires from all of the mobile users. As a result, it is only necessary to determine the powers to be assigned to be able to determine both data rates and powers for each user.

In step 27 the users are arbitrarily classified into power groups In the preferred embodiment, the two power groups used are either (i) maximum power limited or (ii) not maximum power limited. As discussed in greater detail below, well-reasoned heuristic choices can simplify the decision-making process. A maximum power limited user is a user who is required to transmit at his maximum power while a user who is not power limited will be told by the base station to transmit at a power less than his maximum.

After step 27, the mobile users are then classified in step 29 into three groups based on the data rates that the base station will assign them. The first set, P1, consists of users assigned data rates which are in between minimum and maximum rate requirements of the users. P2 consists of users assigned a minimum data rate and P3 consists of users assigned a maximum data rate.

Next, as illustrated in step 31, using constants, the powers of all users in P2 and P3 can be expressed in terms of powers of users in P1. Then in step 31 powers of all users in P1 are expressed in terms of the power of a single user in P1 and the total in-cell interference $\beta$.

Once the powers of all users in P1 has been restated, then in step 35, the power of the single user, which remains undetermined in step 31, is computed for a certain in-cell interference $\beta$, which is the total interference generated from within the cell (sum of powers of all active mobile users in cell) that can be tolerated by the network.

In Step 37, the system begins to work its way back to determine the powers and data rates of the remaining users. As shown in step 37, the system derives the powers for all users in sets P1, P2 and P3 using the relations established in steps 31 and 33. Then in step 39, the data rates are derived using the relations established in step 25. At decision point 41, the system loops back to step 27 and performs steps 29 through 39 for a new classification of users in terms of powers and data rates. This loop is performed until all possible classifications of users into the different power and data rate sets are exhausted.

Finally, at step 43, the system determines the power and data rate allocation for the classification that yields the highest sum of data rates of all users. This is the final data rate and power assignment made by the base station to the mobile users requesting bandwidth.

The above procedure is computationally intense as the number of combinations of the discussed classifications of power groups and rate groups grows exponentially with the number of users M.

The following is a mathematical analysis of the steps leading up to the optimal rate and power solution. Let M denote the number of users requesting bandwidth. The spread spectrum bandwidth is W. Each user uses a single code. Let $r_i$ denote the data rate assigned to the user i. The processing gain of the code used by the user i is $$\frac{w}{r_i}.$$

Based on the date rate requirements of the applications, the data rates are constrained by minimum and maximum rate requirements. Let $$r_i^{min} \text{ and } r_i^{max}$$

denote the minimum data rate and maximum rate respectively, required by the user i. Within the VG-CDMA network $r_i$, is a continuum while in the MC-CDMA network the number of codes $c_i$ is discrete. The rate allocation vector for the M users is denoted by r. Let $\gamma_i$ denote the $$\frac{Eb}{No}$$

threshold for user i. Also define $T_i = \gamma_i * r_i/W$.

The received power per code from the ith user is $s_i$. Let $s^{max} = \lfloor s_1^{max} s_2^{max} \ldots s_M^{max} \rfloor$ be the peak received power vector. $s_i^{max}$ is a function of the handset transmitter peak output power and the propagation gain from the user's current location (the user's power budget). Note that $s_i^{max}$ can change with the location and velocity of the user, as the channel conditions between the user and the base station vary. Let $\eta$ represent the thermal noise plus out-of cell interference power. Let s denote the vector of received powers for the M users. The power allocation associated with a data rate allocation r is referred to as s(r). A data rate allocation r is said to be "feasible," if there exists a power vector $s(r) \leq s^{max}$.

The $E_b/N_0$ for the user i is:

$$\left(\frac{E_b}{N_o}\right)_i = \frac{\frac{w}{r_1} \times s_i}{\sum_{j \neq i} s_j + \eta} \geq \gamma_i$$

The objective of the admission control policy is to determine the rate vector r such that the overall traffic carried by the system is maximized i.e., the sum of the data rates allocated to the M users (or a subset of the M users) is maximized. When a user's data rate is increased by the admission policy, the processing gain decreases and the quantity $T_i$ increases. In the MC-CDMA network $T_i$ remains unaffected as codes are assigned to the user i. As the $T_i$ value increases, the users require higher powers to maintain Quality of Service (QoS) as compared to power levels required to sustain the same increase in data rate for a user having a lower $T_i$.

$$r_i^* = \frac{\frac{w}{s_i^*} \times \gamma_i}{\sum_{j=1, j \neq 1}^{M} s_j^* + \eta} \quad (1)$$

The optimal rate vector r* can be determined if the power allocation s* is determined. The users are classified in groups based on their rate and power allocations as below Define the following sets:

$$\Phi = \{\text{users } i : s_i^* < s_i^{max}\} \quad (2)$$

$$\Pi_1 = \{\text{users } i : r_i^* \neq r_i^{max}, r_i^* \neq r_i^{min}\} \quad (3)$$

$$\Pi_2 = \{\text{users } i : r_i^* = r_i^{min}\} \quad (4)$$

$$\Pi_3 = \{\text{users } i : r_i^* = r_i^{max}\} \quad (5)$$

The set $\Phi$ represents those mobiles that are operating at their maximum received power at the optimal rate-power allocation. Similarly, the sets $\Pi$ classify the users based on their data rates at the optimal allocation. The complement of set X is denoted by X'.

The powers of the users belonging to sets $\Pi_2$ and $\Pi_3$ can be expressed in terms of the powers of users in set $\Pi_1$ by using equation (1).

$$Ws_j^* - r_j^{min} \gamma_j \left( \sum_{i \in \Pi_2, i \neq j} s_i^* + \sum_{i \in \Pi_3} s_i^* \right) + r_j^{min} \gamma_j \left( \sum_{i \in \Pi_1} s_i^* + \eta \right) \forall j \in \Pi_2 \quad (6)$$

$$Ws_j^* - r_j^{max} \gamma_j \left( \sum_{i \in \Pi_3, i \neq j} s_i^* + \sum_{i \in \Pi_2} s_i^* \right) + r_j^{min} \gamma_j \left( \sum_{i \in \Pi_1} s_i^* + \eta \right) \forall j \in \Pi_3 \quad (7)$$

These are a set of N linear equations ($N = |\Pi_2| + |\Pi_3|$), in N unknowns (powers of the users in sets $\Pi_2$ and $\Pi_3$). Therefore, solving for the powers of the users in set $\Pi_i$ will result in determining the optimal rate and power allocation. The powers of the users in set $\Pi_2$ may be expressed as follows:

$$s_i = f_j \left( \sum_{i \in \Pi_i} s_i^* + \eta \right) \forall \ j \in \Pi_2 \quad (8)$$

$$f_j = r_j^{min} \gamma_j \left( \frac{1}{W + r_j^{min} \gamma_j} + \frac{r_j^{min} \gamma_j}{x(W + r_j^{min} \gamma_j)^2} \right) + \quad (9)$$

$$\left( \frac{r_j^{min} \gamma_j}{x(W + r_j^{min} \gamma_j)^2} \right) \left( \sum_{j \in \Pi_2} r_j^{min} \gamma_j + \sum_{j \in \Pi_3} r_j^{max} \gamma_j \right)$$

$$x = 1 - \sum_{j \in \Pi_2} r_j^{min} \gamma_j (W + r_j^{min} \gamma_j) + \sum_{j \in \Pi_3} r_j^{max} \gamma_j (W + r_j^{max}) \quad (10)$$

The terms $f_i$ are independent of all power terms. The powers of the users in set $\Pi_3$ may be expressed as follows:

$$s_j = f_1 \left( \sum_{i \in \Pi_1} s_i^* + \eta \right) \forall \ j \in \Pi_3 \quad (11)$$

$$f_j = r_j^{max} \gamma_j \left( \frac{1}{W + r_j^{max} \gamma_j} + \frac{r_j^{max} \gamma_j}{x(W + r_j^{max} \gamma_j)^2} \right) + \quad (12)$$

$$\left( \frac{r_j^{max} \gamma_j}{x(W + r_j^{max} \gamma_j)^2} \right) \left( \sum_{j \in \Pi_2} r_j^{min} \gamma_j + \sum_{j \in \Pi_3} r_j^{max} \gamma_j \right)$$

$$x = 1 - \sum_{j \in \Pi_2} r_j^{min} \gamma_j (W + r_j^{min} \gamma_j) + \sum_{j \in \Pi_3} r_j^{max} \gamma_j (W + r_j^{max}) \quad (13)$$

Since the powers of the users belonging to set $\Phi'$ are known to be $s_i^{max}$, we need to determine the powers of the users i that are belong to both sets $\Phi$ and $\Pi_i$. The following result helps determine the required powers for user i.

Let us define the following:

$$I_1 = \sum_{j \neq 1} s_i^* + \eta \quad (14)$$

$I_i$ is the effective interference experienced by the user i. Also, let $$B = \sum_{i=1}^{M} s_i^*.$$

B is a measure of the total interference generated by users in the sector. From the definition of $I_i$, we know that $I_i = B + \eta + s_i$. Therefore, the powers of all users k, k ≠ i, can be expressed in terms of a single user i.

$$s_k = (B + \eta)\left(1 - \sqrt{\frac{\gamma_1}{\gamma_k}}\right) + s_i \sqrt{\frac{\gamma_i}{\gamma_k}} \quad (15)$$

The powers for the users j in sets $\Pi_2$ and $\Pi_3$ can be expressed in terms of the power $s_i$ of user i in by using (15), (8) and (11).

$$s_j = f_j \times \left(s_i \left(\sum_{k \in \Pi_1} \sqrt{\frac{\gamma_i}{\gamma_k}}\right) + \sum_{k \in \Pi_1} (B + \eta)\left(1 - \sqrt{\frac{\gamma_i}{\gamma_k}}\right)\right) \quad (16)$$

Now we need to determine the power $s_i$ of user i. The powers of all the other users can be determined from (15) and (16). Since $$B = \sum_{u=1}^{M} s_i,$$

we have the following:

$$B - \left(\sum_{k \in (\Phi \cap \Pi_1)} (B + \eta)\left(1 - \sqrt{\frac{\gamma_1}{\gamma_k}}\right) + \sum_{j \in (\Phi \cap \Pi_1)} s_j^{\max}\right) \times \quad (17)$$

$$\left(1 + \sum_{j \in \Pi_2} f_j + \sum_{j \in \Pi_3} f_j\right) - \eta \left(\sum_{j \in \Pi_2} f_j + \sum_{j \in \Pi_3} f_j\right) =$$

$$s_1 \left(\sum_{k \in (\Phi \cap \Pi_1)} \sqrt{\frac{\gamma_1}{\gamma_k}}\right)\left(1 + \sum_{j \in \Pi_2} f_j + \sum_{j \in \Pi_3} f_j\right)$$

The mathematical results that are derived above may be used to determine the optimal power-rate allocation as follows:

Consider all possible combinations of users resulting in the sets β, $\Pi_1$, $\Pi_2$ and $\Pi_3$. For each such combination of these sets as defined in equations (3–5) compute as follows:

Using equations (9–12) determine the constant coefficients $f_i$, which relate the powers of the users in sets $\Pi_2$ and $\Pi_3$, to the powers of users in set $\Pi_1$.

Using equation (17) determine the power $s_i$.

Using equation (15) determine the powers of the other users in $\Pi_1$ and then, using equation (16) determine the powers of the users in $\Pi_2$ and $\Pi_3$. The only remaining variable is the total interference power B. Powers of all users in the sector are functions of B alone.

Determine the optimal power vector using the maximum value of B. This would depend on the peak-received powers from all mobiles or the interference threshold established in order to limit interference to neighboring sectors.

Using equation (1) determine the optimal rate allocation for the particular choice of sets.

Compare the rate allocations so determined for all possible combinations of the above sets to determine the optimal rate allocation.

The above procedure is computationally intense as the number of combinations of the set Φ, $\Pi_1$, $\Pi_2$ and $\Pi_3$ that result grows exponentially with the number of users M.

When the data rate constraints of the users are removed, the optimization approach discussed above is considerably simplified as the sets $\Pi_2$ and $\Pi_3$ are empty. Since the complexity of the optimal solution lies in having to consider all possible combinations of the sets Φ, $\Pi_1$, $\Pi_2$ and $\Pi_3$, approximate solutions may be obtained by intelligent heuristic choices of these sets.

The set Φ' comprises of all users who operate at the maximum power. The candidate user for the set Φ' may be chosen from users who have low power budgets and are likely to operate at maximum power. In practice, location plays a significant factor in this determination. A user at a remote location relative to the nearest reception/transmission cell of the network is most likely required to operate at maximum power as opposed to users closely adjacent such a cell. Users having high values of y, are more likely to belong to set Φ. Also, consider the ratios $$T_i^{\max} = \frac{\gamma_i}{W/r_i^{\max}} \text{ and } T_i^{\max} = \frac{\gamma_i}{W/r_i^{\min}}.$$

When users with higher $T_i^{min}$ are serviced, this results in a higher increase in powers and interference as compared to servicing users with lower $T_i^{min}$. Therefore, the users with lower $T_i^{min}$ may be chosen as candidates for the set $\Pi_3$. Users with lower values of $T_i^{max}$ are more likely in set $\Pi_2$. Users between the values of $T_i^{min}$ and $T_i^{max}$ are assigned to set $\Pi_i$. Once the sets Φ, $\Pi_1$, $\Pi_2$ and $\Pi_3$ are determined, based on these heuristic arguments, the steps in the optimal approach can be followed to determine the rate and power allocations.

The teachings presented herein provide efficient methods of assigning users data rates while improving the capacity of a DS-CDMA system. The optimal allocation algorithm in MC-CDMA networks can be easily implemented. For VG-CDMA networks, the problem is considerably simplified by the absence of rate constraints. Even with the constraints, a methodology has been proposed that, while computationally intense, is guaranteed to yield the optimal rate-power allocation. An important result is that for the optimal allocation, the ratio of interference experienced by two users is equal to the square root of the reciprocal of their γ targets. This result may be used in heuristic based algorithms to yield power allocations, which are sub-optimal but still provide high capacity. Sub-optimal algorithms for VG-CDMA networks are easy to implement and may be expected to provide significant improvement in capacity.

The above systems have been described for a cellular environment. But they are just as applicable, for example, in a fixed wireless environments using CDMA, including and not limited to locally area networks, wide area networks and metropolitan area wireless networks. When in a fixed wireless environment, it is possible to replace the number of mobile users with the number of fixed wireless terminals and then perform the teachings of the disclosed invention for efficient power and admission control in the fixed wireless network using CDMA.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. An admission control procedure for traffic in a DS-CDMA system comprising the following steps:
    a) admitting to the system and activating codes for users with increasing order of signal to noise ratios starting with the lowest signal to noise ratio;
    b) determining the power level of all active users and raising the power levels to compensate for the interference caused by the admission of new users; and
    c) activating new codes in steps of one while ensuring no active user is power limited.

2. An admission control procedure as set forth in claim 1 wherein the admission control procedure activates the code with the least impact on power levels and interferences.

3. An admission control procedure as set forth in claim 1 wherein the admission control procedure is terminated when at least one user becomes power limited.

4. An admission control procedure as set forth in claim 1 wherein the power levels of active users is reduced as codes leave the system.

5. An admission control procedure as set forth in claim 1 wherein the DS-CDMA system is one of local area network, wide area network, metropolitan area network and a fixed wireless network.

6. A procedure for admission control in a DS-CDMA network comprising the following steps:
    a) arranging network users in increasing order based on their bit energy to noise requirements;
    b) beginning network admission with a first network user and allocating as many codes as requested and feasible;
    c) continuing network admission for each consecutive network user; and
    d) testing to see if an additional number of potential codes can be activated simultaneously and if an acceptable overall power allocation exists for each of the potential codes, comprising the sub-step of activating the potential codes if the acceptable overall power allocation exists and the sub-steps of rejecting the potential codes and terminating network admission if the acceptable overall power allocation does not exist.

7. A procedure for admission control as set forth in claim 6 wherein the number of codes allocated to the first network user is limited by power and performance constraints.

8. A procedure for admission control as set forth in claim 6 wherein the number of codes assigned to all network users is limited by power and performance constraints.

9. A procedure for admission control as set forth in claim 6 wherein successively smaller numbers of potential codes are tested for simultaneous activation until an acceptable overall power allocation is found such that the code activation requests corresponding to the smaller numbers of potential codes is accepted.

10. A procedure for admission control as set forth in claim 6 wherein the acceptance of the number of codes terminates the admission process.

11. A procedure for admission control in a DS-CDMA network comprising:
    a) considering new potential codes for activation in increments of 1;
    b) checking each new code to make certain that there is a feasible power allocation for all active codes and each new potential code; and;
    c) admitting the new potential code if the feasible power allocation exists; and rejecting the potential code and terminating the procedure if the feasible power does not exist.

12. A procedure for admission control as set forth in claim 11 wherein the feasible power allocation does not exist if the power that would be required by all active users upon activation of the new code, is greater than a maximum transmission power capability of all users.

13. A procedure for admission control as set forth in claim 12 wherein the feasible power allocation further does not exist if a received bit energy to noise power ratio minimum threshold target is not met for the active codes.

14. A method for implementing potential users on a DS-CDMA network comprising the following steps:
    a) relating data rates of all users in terms of powers;
    b) separating the users into different power groups and selecting a power group for further processing;
    c) classifying the users into different data rate sets;
    d) deriving powers of the users in the different sets based on a maximum acceptable in-cell interference for the selected power group;
    e) determining data rates of the users from the derived powers; and
    f) selecting a different power group and undertaking the classifying, deriving and determining steps to provide various data rate and power allocations.

15. A method for implementing potential users as set forth in claim 14 further comprising the step of picking the allocation that yields the highest sum of data rates for the users.

16. A method for implementing potential users as set forth in claim 14 wherein the different power groups are arbitrarily separated, the separation comprising maximum power limited and maximum power not limited.

17. A method for implementing potential users as set forth in claim 14 wherein the different rate sets comprises a first set of users at a minimum data rate, a second set of users at a maximum data rate, and a third set of users at a data rate between the minimum data rate and the maximum data rate.

18. A method for implementing potential users as set forth in claim 14 wherein the VG-CDMA network is one of local area network, wide area network, metropolitan area network and a fixed wireless network.

19. A method for implementing potential users as set forth in claim 14 wherein said separating step comprises the sub-step of considering the location of the users relative to a nearest reception/transmission cell of the network, placing the users operating at maximum power in view of their distance from the cell in a maximum power group.

20. A method for selecting the optimum power and data rate to be used to maximize the throughput through a DS-CDMA network comprising the following steps:
    a) organizing the users into the following sets:
        0) users operating at less than the maximum power;
        1) users not operating at the maximum data rate or the minimum data rate;
        2) users operating at the minimum data rate; and 3) users operating at the maximum data rate;
b) determining the constant coefficients, which relate the powers of the users in sets 2 and 3, to the powers of the users in set 1;
c) determining the powers of all users in set 1 in terms of the power of any single arbitrarily chosen user denoted by i,
c) determining the power of the single user with undetermined power $s_i$ in set 1,
d) determining the power of the remaining users in set 1 and then determining the powers of the users in sets 2 and 3;
e) determining the total interferences generated by the users in the network;
f) determining the optimal power vector using the maximum value of interference;
g) determining the optimal rate allocation for the particular choice of sets; and
h) comparing the rate allocations for all possible combinations of the sets and solving for an optimal rate allocation.

21. A method for selecting the optimum power and data rates as set forth in claim 20 wherein the total in-cell interference in step e) is the sum of the received power of all users.

22. A method for selecting the optimum power and data rate as set forth in claim 20 wherein the power of all users of the network are functions of the total in-cell interference.

23. A method for selecting the optimum power and data rate as set forth in claim 20 wherein the organizing of the users into the first set based on the power being used is an in or out test based on the power levels of the users relative to the maximum received power.

24. A method for selecting the optimum power and data rate as set forth in claim 23 wherein all users having power levels less than the maximum received power are included in the set.

25. A method for selecting the optimum power and data rates as set forth in claim 20 wherein at the optimal power and rate allocation the rates of the interference experienced by any two users is equal to the square met of the reciprocal of their bit energy to noise targets.

26. A method for selecting the power and data rates to be used to substantially maximize the throughput through a DS-CDMA network comprising the following steps:
a) organizing users into the following sets:
0) users having high values of signal to noise ratio;
1) users with high signal to noise ratio requirements;
2) users with lower values of $$T^{min} \text{ where } T = \frac{\frac{E_b}{N_o}}{\frac{W}{r}};$$

3) users with lower values of $T^{max}$.
b) determining the constant coefficients, which relate the powers of the users insets 2 and 3 to the powers of the users in set 1;
c) determining the power of the users in set 1 with the lowest maximum signal to noise ratio;
d) determining the power of the remaining users in set 1 and then sets 2 and 3;
e) determining the total interference of the users on the network;

f) determining the power vector using the value of in-cell interference;
g) determining the rate allocation based on the determined power vector;
h) determining the power and data rate vector for all possible classifications of the users in the different sets;
i) comparing the rate allocations for all possible combinations of the above sets to determine the optimal rate allocation the yields the maximum sum of the data rates.

27. A method for selecting the optimum power and data rate for use in a DS-CDMA network comprising the following steps:
a) organizing network users into sets based on their data rates;
b) determining the constants that relate the powers of the latter set members to the power of the user in the earlier sets;
c) determining the power of the first member of the first set;
d) determining the powers of the remaining members of the first set, and the power of all members of the remaining sets;
e) determining the power vector from the total in-cell interference;
f) determining the rate allocation for the particular choice of sets; and
g) comparing the rate allocations as determined to select the optimal rate allocation.

28. A method for selecting the optimum power and data rates as set forth in claim 27 wherein the transmit powers have to be recalculated when a multi-media user changes data rates to meet a data transmission requirement.

29. A method for selecting the optimum power and data rates as set forth in claim 27 wherein the users are divided into sets based on the use of maximum rate, minimum rate, and a rate between maximum and minimum.

30. A method for selecting the optimum power and data rates as set forth in claim 27 wherein at the optimal power and rate allocation, the ratio of interference experienced by the users is equal to the square root of the reciprocal of their bit energy to noise targets.

31. A DS-CDMA network comprising:
a plurality of users having different bit energy to noise requirements;
a limited number of potential codes available to be used by the users;
a limited overall power allocation available for each of the potential codes; and
an admission protocol, the admission protocol maximizing the capacity utilization within the network with the limited overall power allocation, whereby the admission protocol may be used to admit users to the network.

32. A DS-CDMA network as set forth in claim 31 wherein the admission protocol arranges the networks in increasing order based on the bit energy to noise requirements.

33. A DS-CDMA network as set forth in claim 32 wherein the admission protocol includes testing of multiple potential codes for generally simultaneous activation, the number of multiple potential codes being reduced until an acceptable threshold is met.

34. A DS-CDMA network as set forth in claim 33 wherein the acceptable threshold is limited by the limited overall power allocation such that code failure is minimized for every user within the network.

35. A DS-CDMA network as set forth in claim 31 wherein the admission protocol includes:
- a second plurality of the users being at different powers, the users being separated into different power groups;
- a third plurality of the users being at different data rates, the users being separated into different data rate sets; and
- a maximum in-cell interference being available for the users in each of the different power groups, wherein the allocation process optimizes the different powers and the different data rates to determine the data rate and the power for each user.

36. A DS-CDMA network as set forth in claim 35 wherein the users are placed in at least two different power groups, a first power group being limited in power and a second power group operational at maximum power.

37. A DS-CDMA network as set forth in claim 36 wherein a user at a high power in view of its remote location from a nearest/transmission cell is placed into the second power group.

38. A DS-CDMA network as set forth in claim 35 wherein the different rate sets comprise a first rate act of users at a minimum data rate, a second set of users at a maximum data rate, and a third set of users at a data rate between the minimum data rate and the maximum data rate.

* * * * *